Sept. 15, 1942. W. A. THOMAS ET AL 2,295,877
STADIMETER GEARING
Filed March 16, 1942 2 Sheets-Sheet 1
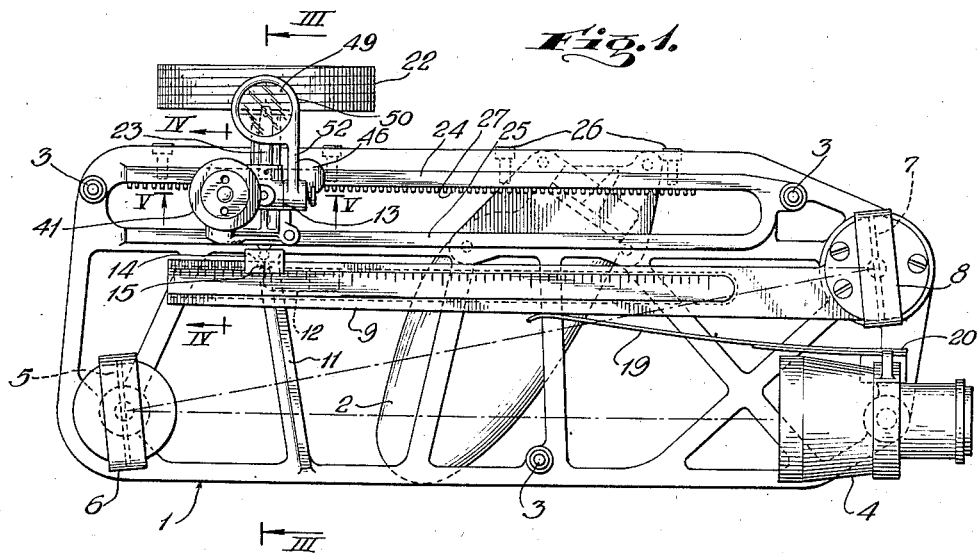
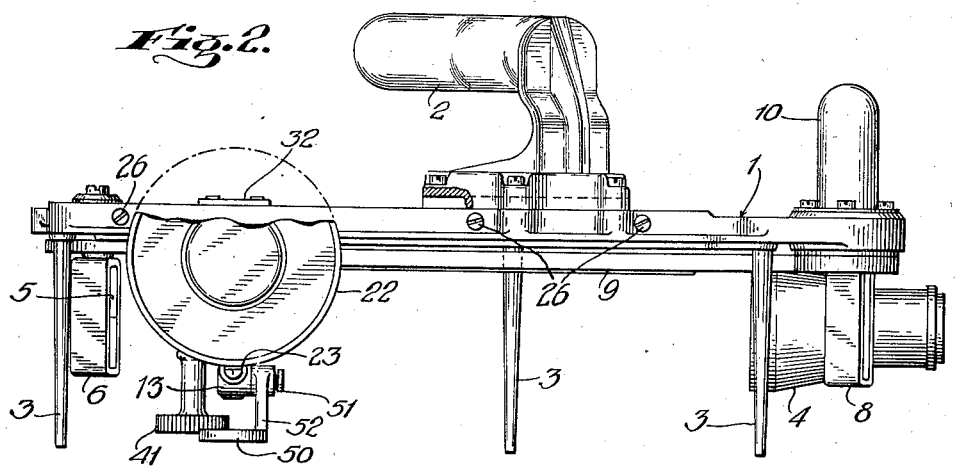
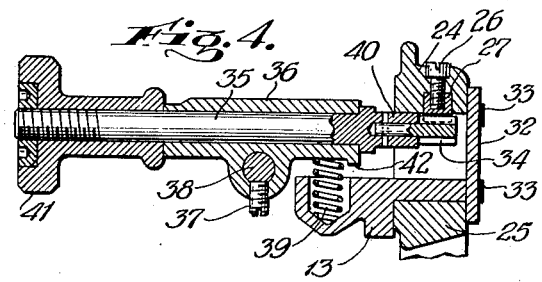
WILLIAM A. THOMAS
DOUGLAS F. LINSLEY
INVENTORS
ATTORNEY Sept. 15, 1942.  W. A. THOMAS ET AL  2,295,877
STADIMETER GEARING
Filed March 16, 1942  2 Sheets-Sheet 2
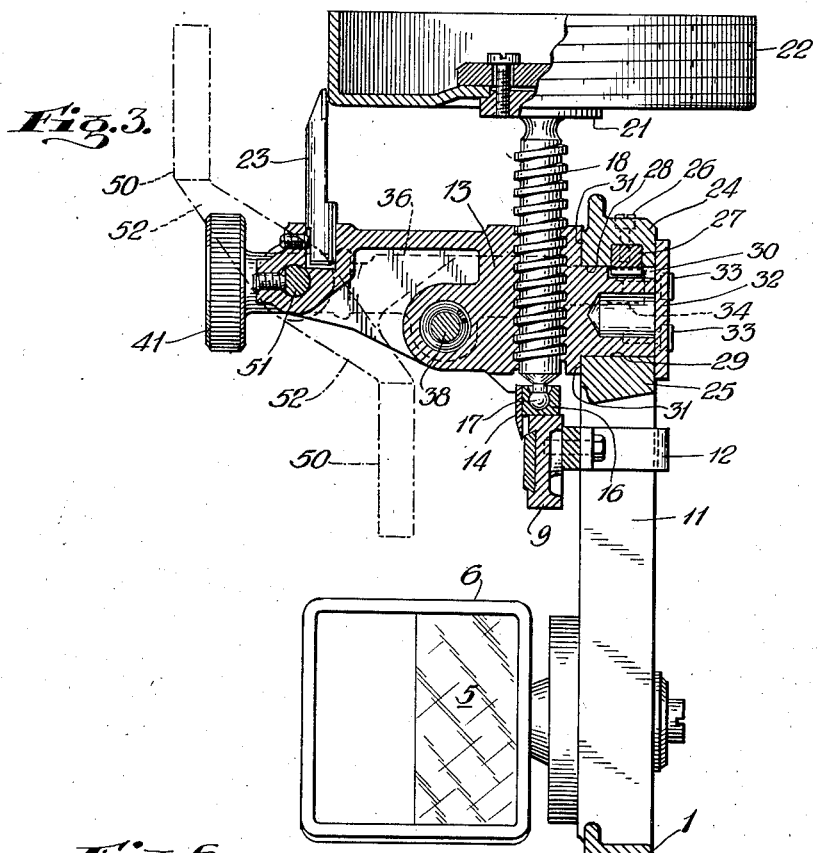
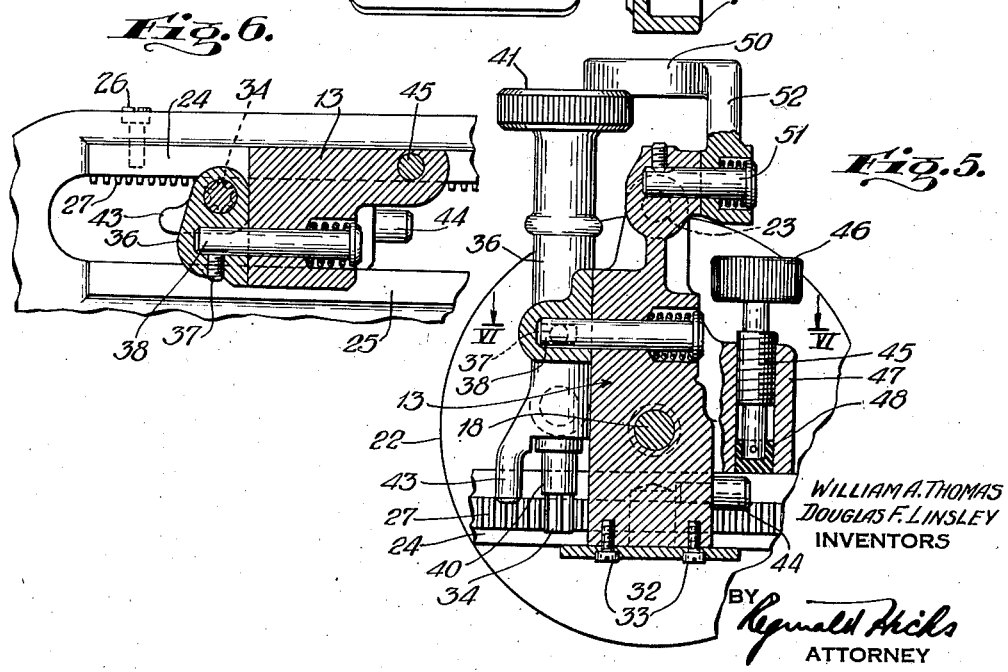
WILLIAM A. THOMAS
DOUGLAS F. LINSLEY
INVENTORS
BY Reginald Hicks
ATTORNEY Patented Sept. 15, 1942

2,295,877

UNITED STATES PATENT OFFICE 2,295,877

STADIMETER GEARING

William A. Thomas, Riverside, and Douglas F. Linsley, Greenwich, Conn., assignors to Schick Incorporated, Stamford, Conn., a corporation of Delaware Application March 16, 1942, Serial No. 434,932

7 Claims. (Cl. 74—422)

The invention relates particularly to precision instruments such as range-finders of the kind adapted to measure the distance from an observer to an object of known height, such instruments being commonly called stadimeters.

The principal objects and advantages of the invention as applied to a stadimeter reside in the provision of means whereby the usual movable carriage is more readily adjustable to the different positions required in accordance with the heights of the different objects to be observed and of a carriage structure and associated parts so organized as to reduce to a minimum the likelihood of derangement under the hard conditions of service to which such instruments are subjected and susceptible of manufacture at relatively low cost.

The invention will be clear from the following description and accompanying drawings, of which Fig. 1 is an elevation (with reference to its position while in use) of a stadimeter embodying the invention; Fig. 2 is a plan; Fig. 3 is an enlarged section on the line III—III of Fig. 1; Fig. 4 is an enlarged section on the line IV—IV of Fig. 1; Fig. 5 is an enlarged section on the line V—V of Fig. 1; and Fig. 6 is an enlarged section on the line VI—VI of Fig. 5.

In the form of the invention illustrated, the basic elements common to stadimeters as heretofore constructed will be readily recognized. As usual, the chassis of the instrument consists of a frame 1, a handle 2 by which the instrument is held when in use (in the position indicated in Fig. 1) and legs 3 on which the instrument stands when not in use (the position indicated in Fig. 2). The particular design of chassis illustrated is no part of the present invention, being the subject of a copending application Serial No. D–106,-053, filed March 2, 1942. The frame is of cast bronze or other suitable rust-resistant material with various machined surfaces as indicated and as will be later referred to so far as pertinent to the present invention.

The frame 1 carries the customary optical system consisting of a telescope 4, mirror 5 mounted in frame 6 and mirror 7 mounted in frame 8. As usual, mirror 7 extends across the full width of its frame and mirror 5 extends across one-half the width of its frame, whereby one-half of an object on which the telescope is trained is viewed directly (through the open half of frame 6) and the other half of the object is viewed as an image reflected by the mirrors. The half-mirror frame 6 is rigidly secured to the instrument frame 1 at an angle to the telescope axis, as indicated; and mirror frame 8 is rotatably adjustable relative to the instrument frame about an axis passing through the center of mirror 7 at right angles to the telescope axis. Such angular adjustment of mirror 7 is effected by means of a scale arm 9 to which mirror frame 8 is rigidly secured, reference 10 (Fig. 2) indicating a housing for any suitable pivot post or bearing to support the scale arm and mirror frame 8 with freedom for movement about the described axis. Toward its free end the scale arm may be arranged to bear on the finished surface of cross brace 11 of the instrument frame, a bracket 12 secured to the scale arm overlying the other side of cross brace 11 to resist lateral movement of the scale arm.

As usual, there is provided a carriage (generally designated 13 and described in detail below) which is movable longitudinally of the instrument frame to whatever position of adjustment is required by the height of the object whose distance is to be measured. As will be understood, the scale arm 9 is marked off in such heights and a suitable pointer, such as plate 14 marked with an index line 15, is mounted on the carriage in a position to overlie the scale arm. In this instance the pointer is carried by a block 16 (Fig. 3) which is carried on the ball end 17 of scale arm adjusting screw 18 threaded in the carriage. As shown, the lower face of block 16 bears against the adjacent face of scale arm 9 and transmits downward movements of screw 18 to the scale arm, the ball joint permitting block 16 to swing and preserve its bearing against the scale arm in all angular positions of the latter. The scale arm is held in contact with block 16, and is moved upwardly as screw 18 is retracted, by a leaf spring 19 mounted on the instrument frame at 20 with its free end engaging the lower face of the scale arm, as shown in Fig. 1.

To the head 21 of scale arm adjusting screw 18 is secured a drum 22, the periphery of which is calibrated, as usual; and adjacent the calibrated periphery is a pointer 23 mounted on the carriage.

The frame 1 includes a pair of parallel, spaced bars 24, 25 defining a track on which the carriage operates; and extending longitudinally of the space between the track bars, and preferably set into the bar 24 and secured thereto as by screws 26 is a rack 27.

Referring particularly to Figs. 3, 5 and 6, it will be seen that the body of the carriage structure 13 is so arranged that it may consist of a single casting machined to provide surfaces 28, 29 to engage the inner opposed faces of track bars 24 and 25 respectively. The carriage is cut away as at 30 to accommodate the rack. As shown in Fig. 3, the width of rack 27 is considerably less than that of track bar 24, so that a substantial surface of the track bar still remains for the carriage to bear on at one side of the rack. Shoulders 31 on the carriage bear on the faces of the track bars on one side of the frame and the opposite outer faces of the track bars are engaged by plate 32 secured to the carriage by screws 33, with the result that the carriage is effectively supported on the frame with freedom to slide thereon throughout the length of the track bars.

Supported on the carriage is a pinion 34 which is normally engaged with the rack and is manually rotatable to effect movement of the carriage on the track bars, but the pinion is also bodily movable relatively to the carriage out of engagement with the rack to permit the carriage to be moved quickly along the track bars independently of the rack and pinion. In the preferred construction illustrated, this is achieved by mounting pinion 34 on the end of a shaft 35, the shaft being carried by a journal member 36 which is secured, as by set screw 37, to a pivot stud 38 supported by the carriage (Figs. 5 and 6). As shown, the journal member bears on the side of the carriage and is thus adapted for limited bodily movement relatively to the carriage about the pivot axis, which is parallel to the direction of movement of the carriage. The diameter of pinion 34 is less than the distance between the rack teeth and the inner face of track bar 25 by at least the depth of the pinion teeth, so that journal member 36 can be swung about its pivot 38 to disengage the pinion and rack teeth. A spring 39 (Fig. 4) normally thrusts the journal member 36 in a direction to engage the pinion and rack teeth but in order to relieve the rack and pinion teeth of the thrust of spring 39 and thereby minimize wear, a portion 40 of pinion shaft 35 adjacent the pinion is formed of such a diameter as to engage the adjacent surface of track bar 24 slightly in advance of full engagement of the rack and pinion teeth. Accordingly, as pinion shaft 35 is manually rotated by its hand wheel 41, the periphery of portion 40 of shaft 35 rolls on the track bar 24, the pinion and rack being sufficiently engaged, of course, to cause the carriage to be propelled along the track bars. Suitable stop means is provided to limit the pivotal movement of journal member 36 in a direction to disengage the rack pinion, as by the engagement of the boss 42 on the end of journal member 36 with the body of the carriage adjacent spring 39 (Fig. 4).

The above-described construction is simple, rugged, economical to manufacture and easy to assemble. Also, the required adjustment of the carriage along the track bars can be quickly achieved. If the distance the carriage is to be moved from one setting to another is short, it can be effected by rotating wheel 41. If, on the other hand, the carriage is to be moved any considerable distance along the track bars, it is necessary only to disengage the pinion from the rack by tilting the journal member about its pivot and then slide the carriage approximately to the desired setting. Final carriage adjustment is effected by releasing the journal member to permit the pinion and rack teeth to engage and by rotating hand wheel 41 to bring index line 15 of pointer 14 into alinement with the appropriate graduation on scale arm 9. As already mentioned, the fact that the thrust of spring 39 is taken by the end 40 of shaft 35 avoids undue wear on the rack and pinion teeth; and, as will be recognized, the rolling contact of the end 40 of shaft 35 has no tendency to scuff or mar the inner bearing face of track bar 24.

As shown in Figs. 5 and 6, suitable stop means are provided to limit the movements of the carriage longitudinally of the track bars, such means comprising a lug 43 depending from journal member 36 and a stud 44 projecting from the opposite side of the carriage, the lug and stud respectively engaging the opposite closed ends of the space between the track bars. As also shown in Fig. 5, a screw 45 manually adjustable by its head 46 is threaded in a boss 47 projecting laterally from the body of the carriage above track bar 24 and carries at its lower end a brake shoe 48 by which the carriage can be clamped to such track bar to maintain any desired position of adjustment of the carriage.

In view of the foregoing description and the fact that the general principles underlying the operation of these instruments are well known, the method of use will be but briefly described. As usual, the instrument is so assembled and calibrated that when pointer 23 registers with the "infinity" mark on drum 22 the edge of scale arm 9 against which block 14 bears is parallel with the track bars, so that movement of the carriage along the track bars does not change the angular position of the scale arm. Also, at this time, mirrors 5 and 7 are parallel, so that when the horizon is viewed through the telescope it will appear as a continuous line, even though one-half of it is viewed directly through the open part of mirror frame 6 and the other half of it is viewed as a reflected image. In order to measure the distance of an object of known height, the carriage is moved along the track bars to bring index line 15 of pointer 14 into registry with the calibration on scale arm 9 which corresponds to the height of the object. Then, with the telescope trained on the object, drum 22 is rotated (thereby adjusting the scale arm and mirror 7) until the reflected image of the base line of the object is brought into registry with the directly viewed top of the object. This operation, as will be understood, simply consists in gauging the angle which the objects subtends; and since the distance of the object is a function of the tangent of the angle subtended, the drum periphery calibrations can give direct readings of such distance. To facilitate the reading of the range a magnifying lens 49 (Fig. 1) is provided, the lens being mounted in a frame 50 which is mounted by a pivot 51 on the carriage, the lens frame arm 52 being offset so that the lens may be swung into either of the positions indicated in dotted lines in Fig. 3 for magnified observation both of the position of pointer 23 with respect to the drum calibrations and of the position of pointer 14 with respect to the scale arm graduations.

The following is claimed:

1. In a stadimeter having a pair of parallel, spaced track bars and a carriage mounted for longitudinal movement thereon, the combination of a rack extending along the inner face of one of said bars, said rack being of a width less than the width of such bar to leave a track bar bearing surface on the said face adjacent the rack throughout the length thereof, a pinion between the track bars to engage the rack teeth and of a diameter less than the distance between the rack teeth and the inner face of the opposite track bar by at least the depth of the pinion teeth, a manually rotatable shaft to one end of which said pinion is secured, a bearing member for said shaft pivotally mounted on the carriage for movement relatively thereto about an axis parallel to the direction of movement of the carriage to move the pinion out of and into engagement with the rack, a spring urging the bearing member into position to engage the pinion and rack teeth, a portion of said shaft adjacent the pinion being of a diameter to engage the said track bar bearing surface adjacent the rack slightly in advance of full engagement of the pinion and rack under the influence of said spring, and a stop member on the bearing member engageable with the carriage to limit the movement of the pinion towards such opposite bar.

2. In a stadimeter having a pair of parallel, spaced track bars and a carriage mounted for longitudinal movement thereon, the combination of a rack extending along the inner face of one of said bars, said rack being of a width less than the width of such bar to leave a track bar bearing surface on the said face adjacent the rack throughout the length thereof, a pinion between the track bars to engage the rack teeth and of a diameter less than the distance between the rack teeth and the inner face of the opposite track bar by at least the depth of the pinion teeth, a manually rotatable shaft to one end of which said pinion is secured, a bearing member for said shaft pivotally mounted on the carriage for movement relatively thereto about an axis parallel to the direction of movement of the carriage to move the pinion out of and into engagement with the rack, a spring urging the bearing member into position to engage the pinion and rack teeth, and stop means for engagement respectively with said track bar bearing surface and with the carriage to limit the pivotal movements of the bearing member about its said axis.

3. In a stadimeter having a pair of parallel, spaced track bars and a carriage mounted for longitudinal movement thereon, the combination of a rack extending along the inner face of one of said bars, said rack being of a width less than the width of such bar to leave a track bar bearing surface on the said fact adjacent the rack throughout the length thereof, a pinion between the track bars to engage the rack teeth, a manually rotatable shaft to one end of which said pinion is secured, a bearing member for said shaft supported on the carriage with freedom for limited bodily movement relatively thereto in a direction to move the pinion toward and from the rack teeth, spring means urging the bearing member in a direction to move the pinion toward the rack teeth, and a bearing surface carried by the bearing member adapted to engage said track bar bearing surface slightly in advance of full engagement of the pinion and rack under the influence of said spring.

4. In a stadimeter having a pair of parallel, spaced track bars and a carriage mounted for longitudinal movement thereon, the combination of a rack located in and extending longitudinally of the space between said bars, a pinion to engage the rack teeth, a manually rotatable shaft to which said pinion is secured, a bearing member for said shaft with freedom for limited bodily movement relatively thereto in a direction to move the pinion toward and from the rack teeth, spring means urging the bearing member in a direction to move the pinion toward the rack teeth, and a stop carried by the bearing member adapted to engage one of the track bars slightly in advance of full engagement of the pinion and rack under the influence of said spring.

5. In a stadimeter having a pair of parallel, spaced track bars and a carriage mounted for longitudinal movement thereon, the combination of a rack extending along the inner face of one of said bars, a pinion to engage the rack teeth, a pinion shaft supported in a journal member, said member pivotally mounted on the carriage for movement about an axis parallel to the direction of movement of the carriage to move the pinion out of and into mesh with the rack, a spring urging said member into position to engage the pinion and rack teeth, a portion of said shaft adjacent the pinion constituting a stop to limit the movement of said member under the influence of its spring and a stop on the journal member engageable with the carriage to limit the movement of such member in the opposite direction.

6. In a stadimeter having a pair of parallel, spaced track bars and a carriage mounted for longitudinal movement thereon, the combination of a rack extending along the inner face of one of said bars, a pinion to engage the rack teeth, a pinion shaft supported in a journal member, said member pivotally mounted on the carriage for movement about an axis parallel to the direction of movement of the carriage to move the pinion out of and into mesh with the rack, a spring urging said member into position to engage the pinion and rack teeth, and stop means to limit the pivotal movements of the journal member about said axis.

7. In a stadimeter having a pair of parallel, spaced track bars and a carriage mounted for longitudinal movement thereon, the combination of a rack located in and extending longitudinally of the space between said bars, a pinion to engage the rack teeth, a manually rotatable pinion shaft supported on the carriage with freedom for bodily movement relatively thereto to move the pinion out of and into mesh with the rack, means normally holding the shaft and pinion in rack-engaging position, and stop means to limit the said bodily movements of the shaft independently of the engagement of the rack and pinion.

WILLIAM A. THOMAS.
DOUGLAS F. LINSLEY.